(12) United States Patent
Matsui

(10) Patent No.: US 6,270,868 B1
(45) Date of Patent: Aug. 7, 2001

(54) COMPOSITE CONTAINER WITH STABILIZED BASE

(75) Inventor: Yutaka Matsui, Bardstown, KY (US)

(73) Assignee: Inoac Packaging Group Inc., Bardstown, KY (US)

( * ) Notice: Subject to any disclaimer, the term of this patent is extended or adjusted under 35 U.S.C. 154(b) by 0 days.

(21) Appl. No.: 09/193,512

(22) Filed: Nov. 17, 1998

(51) Int. Cl.[7] .............................. B29D 22/00; A47G 19/22; B29B 7/00; A47J 41/02
(52) U.S. Cl. .................... 428/35.7; 428/34.7; 428/542.8; 215/12.1; 220/62.12
(58) Field of Search ................................ 428/35.7, 542.8, 428/34.4, 34.6, 34.7; 220/62.12, 906; 206/217; 215/12.1, 12.2

(56) References Cited

U.S. PATENT DOCUMENTS

| | | |
|---|---|---|
| 3,091,000 | 5/1963 | Makowski . |
| 3,306,566 * | 1/1966 | Paulson et al. ................. 248/350 |
| 3,851,030 | 11/1974 | Valyi . |
| 3,932,104 | 1/1976 | Schneider . |
| 4,164,298 * | 8/1979 | Nishikawa et al. ................. 215/1 |
| 4,298,567 | 11/1981 | Aoki . |
| 4,303,381 | 12/1981 | Aoki . |
| 4,342,399 * | 8/1982 | Stirling .................................. 215/12 |
| 4,381,277 | 4/1983 | Nilsson . |
| 5,000,904 | 3/1991 | Schiemann . |
| 5,040,317 * | 8/1991 | Kadjevich ............................. 40/324 |
| 5,043,130 | 8/1991 | Fujio . |
| 5,049,349 | 9/1991 | McCullough et al. . |
| 5,443,767 | 8/1995 | Cahill . |
| 5,839,599 * | 11/1998 | Lin ........................................ 220/410 |
| 5,968,616 * | 10/1999 | Kakemura et al. ................. 428/34.2 |
| 6,062,380 * | 5/2000 | Dorney ................................. 206/217 |

* cited by examiner

Primary Examiner—Rena L. Dye
Assistant Examiner—Michael E. Miggins
(74) Attorney, Agent, or Firm—King and Schickli PLLC

(57) ABSTRACT

A composite plastic container is formed by blow molding a body from a plastic parison into a base having a bottom, side walls and an open top, which includes an upper annular edge. A peripheral shoulder defines the upper portion of the body. The double side walls and bottom are relatively thick for strength and stability; the bottom also including a substantially solid rim in alignment with the annular edge for enhanced stability. A central opening in the bottom forms a plastic plug to anchor the bottom to the base. The lip of the shoulder mates and substantially covers the annular edge forming a smooth, rounded interface in the preferred embodiment. The peripheral lip can mate in other ways with the annular edge. Other features include an insert label and a protrusion in a side wall to form a window. In the related method, the steps in the broadest sense include placing the base into a mold, inserting the plastic parison through the open top of the base, blow molding the parison to form a container body and controlling the molding step so as to form a peripheral shoulder mating with the annular edge.

15 Claims, 2 Drawing Sheets

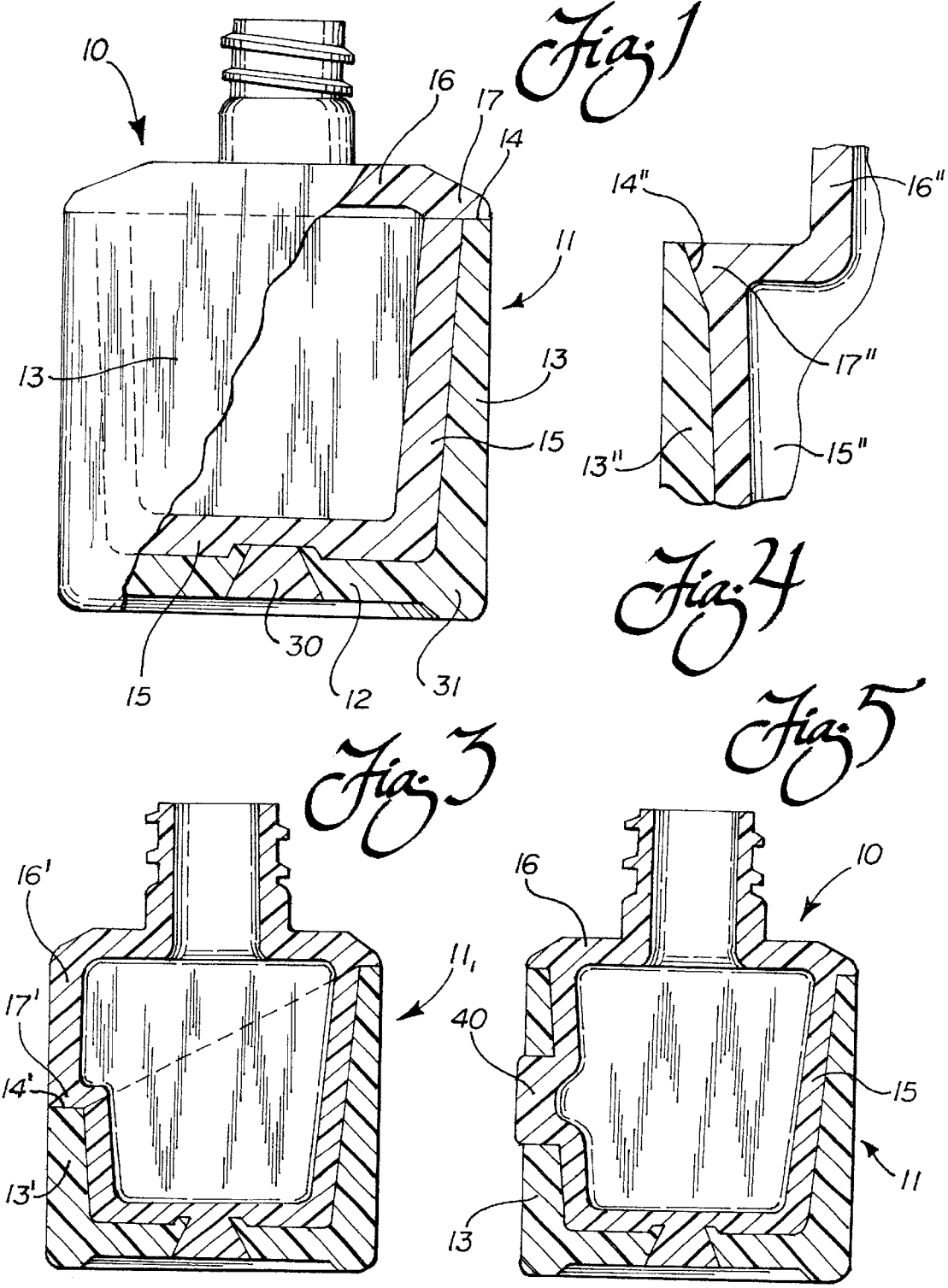

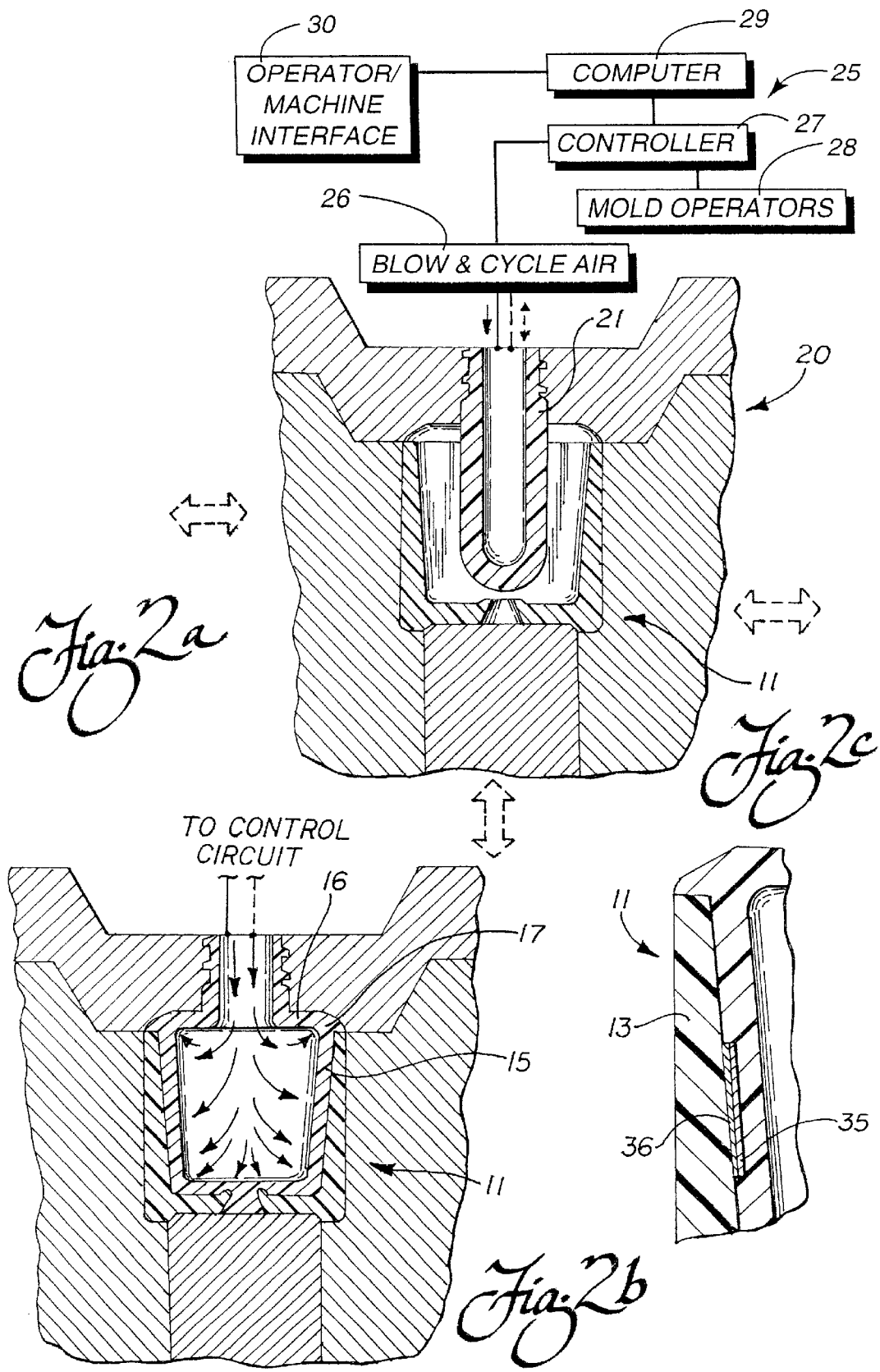

US 6,270,868 B1

COMPOSITE CONTAINER WITH STABILIZED BASE

TECHNICAL FIELD

The present invention is directed to an improved plastic container, and more particularly, to a composite plastic container formed by an open top base and a plastic body blow molded from a parison extending into the base.

BACKGROUND OF THE INVENTION

The use of plastic containers continues to grow in the consumer market at a rapid rate and promises to continue in years to come. In many marketing areas, such as for liquid or semi-liquid (viscous) cosmetics and related products, the plastic container, such as a bottle or jar, is by far the container of choice. A plastic container is not only non-breakable, but can be molded so as to be very attractive, as well as functional. Surface textures and embossed designs can easily be included as the container is being formed. In addition, from a cost standpoint, plastic is very competitive with the other materials used for containers, such as glass.

One of the most popular containers for the marketing of cosmetics, as well as other liquid and semi-liquid products, is the blow molded bottle or jar of a clear, translucent or opaque plastic. Polyethylene terephthalate (PET) with additives for varying light transmission and/or color is a good choice, but of course others can also be chosen. The most common approach for forming such containers is by straight blow molding of a parison in a mold, such as shown in the Nishikawa et al. U.S. Pat. No. 4,164,298, issued Aug. 14, 1979. As illustrated in this patent and others like it, one of the big advantages is being able to provide a container with a variety of geometric shapes and designs that are attractive to the consumer. The entire container is formed from a single tubular parison (see FIG. 4 of the '298 patent). While this type of container is acceptable for many liquids/semi-liquid products, including some cosmetics and related health and body care products, there is a need driven by consumer preference for a stronger and more stable container for marketing such products.

One approach in this direction is represented by the U.S. Pat. No. to Aoki 4,298,567, issued Nov. 3, 1981. In this approach, a separate injection molded base is provided in the mold but cooperates with only the bottom one-fourth of the container. The container body is blow molded and mates in the mold with the short base. As a consequence three-fourths of the container is formed by a single wall thicknesses. This leaves the strength and stability of the bottom improved, but overall there is little improvement.

Also in the past, there has been some effort to increase the strength by simply making the entire container including the neck, shoulder, side walls and bottom as a double wall, such as shown in the Valyi U.S. Pat. No. 3,851,030, issued Nov. 26, 1974. However, this approach greatly increases the overall cost of the container and increases the weight without significantly increasing the strength in the areas where needed. Thus, in the instance where a double wall is to be used for any purpose, there is a need for a simpler, and a more cost effective approach than the '030 patent teaches.

Furthermore, in the area of double wall containers, others have attempted to provide the improvements needed by placement of a blow molded container inside a box, as illustrated in U.S. Pat. No. 5,049,349, issued to McCullough et al. on Sep. 17, 1991. Such a container is bulky, expensive and generally unattractive, especially with regard to cosmetics and related products, and thus is an unsuitable solution.

Accordingly, of the above approaches, the general type of container shown in the '567 patent could be interpreted as being the best overall for marketing liquid and semi-liquid products, such as cosmetics. The container has a body with a double wall base for some increased strength and rigidity. However, the body, that forms three-fourths of the container, has relatively thin side walls that inherently results in decreased strength. Furthermore, the height of the container provides an inherent stability problem. Thin-walled containers such as this are more susceptible to the possibility of puncture, especially if there is a weak point in the side wall where the container is picked up for use. Perhaps most importantly, such a thin wall container gives an impression to the consumer of being flimsy and inexpensive. While being suitable for soft drink containers, this is a substantial drawback for many products, especially in the cosmetics field. Thus, a need is identified for an improved container, such as a bottle or jar, especially for a liquid or semi-liquid cosmetics product, that is easy and inexpensive to form, but has improved functional strength and stability in the side wall and bottom areas. At the same time, the container should have the look and feel of being upscale and relatively expensive, commensurate with the cosmetic or other like product being marketed.

SUMMARY OF THE INVENTION

Accordingly, a primary object of the present invention is to provide an improved composite container that is fabricated of a molded base and a blow molded plastic body that has the above characteristics so as to overcome the identified shortcomings of the prior art.

It is another object of the present invention to provide a container, such as a bottle or jar for cosmetic liquid or semi-liquid products; said container having a body molded from a plastic parison that is positioned through the open top of a base in a mold.

Another object of the present invention is to provide such a container where the base and container body form substantially full depth double side walls and bottom for strength and stability, and a relatively thin shoulder defining the upper portion of the body and mating with the upper annular edge of the base.

It is still another object of the present invention to provide a composite container formed by a base, and a body inside the base; the body having a peripheral shoulder defining the upper portion of the body with a peripheral lip mating and substantially covering the annular edge and forming a smooth, rounded interface.

It is still another object of the present invention to provide a composite container as described, and further including an annular corner on the bottom with sufficient thickness to form a solid rim for enhancing the stability.

Still another object of the present invention is to provide a method of producing a composite container from a base having an open top; namely (1) placing the base in a mold, (2) extending a plastic parison through the open top, (3) blow molding the parison to form the body of the container, and (4) controlling the blow molding to form a peripheral shoulder mating with the upper annular edge of the base, thus providing a container with relatively thick, substantially full depth side walls, and a relatively thick bottom for strength and stability.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, the present invention envisions a composite plastic container that is formed from a base having a bottom, side walls and an open top forming an annular edge, and a blow molded container body extending into the base through the open top. The body extends in juxtaposition to substantially the full extent of the side walls of the base in the preferred embodiment, and a peripheral shoulder is formed on the body defining the upper portion and having a peripheral lip mating with the annular edge of the base. Such a composite container exhibits the functional advantages, as well as the look and feel that have been determined to be important in marketing cosmetics and related liquid and semi-liquid products.

From a functional standpoint the relatively thick side walls and bottom give enhanced strength and stability, and a relatively thin shoulder mates with the upper annular edge of the base. To further enhance the stability of the container, the bottom includes an annular corner that is sufficiently thick to form a substantially solid rim generally in alignment with said annular edge. The desirability of this feature in the composite container is similar to that described and claimed in Applicant's co-pending patent application covering a single wall container, and entitled "Injection/Blow Molded Plastic Container and Method" filed Apr. 30, 1996, and now U.S. Pat. No. 5,874,141, issued Feb. 23, 1999.

In order to improve the forming process, the bottom of the base includes a central opening for receiving plastic from the bottom of the parison during blow molding. A reverse tapered plug is formed to anchor the bottom to the base. In addition, an insert label may be embedded in the finished composite container along one side wall. Furthermore, if viewing of the product is desired, an aperture in at least one side wall is provided so that a window is formed by a protrusion of plastic, also during blow molding. Preferably, the base is plastic and formed by injection molding, but equivalent materials, such as molded glass can be used.

In accordance with a significant feature of the present invention, the shoulder of the container body has a peripheral lip that mates with the upper annular edge of the base and substantially covers the edge in order to form a smooth, rounded interface. This adds strength, and also assures that the attractiveness of the container, such as a bottle or jar used for cosmetic products, is maintained. As an alternative embodiment, the side walls can be internally tapered adjacent the open top to form a bevel portion extending down inside the side walls and in this case the peripheral lip can mate with the bevel portion to provide a different form of connection.

In still another embodiment, the base includes one side wall of reduced height and upwardly tapered adjacent side walls. The shoulder of the body thus forms an angled, annular edge. The peripheral lip of the body forms the same smooth, rounded interface of the preferred embodiment.

By providing different shapes, textures and colored plastics for the base and the body, while utilizing one or more of the above variations, the attractiveness of the container is enhanced, while at the same time maintaining the functional strength and stability built into the physical concepts of the present invention.

In the related method, the steps of forming include placing the base having a bottom, side walls, an open top and an annular edge surrounding the top, into a mold. Next, a plastic parison is inserted into the base through the open top and the parison is blow molded to provide biaxial stretching into juxtaposition with the inside surface of the base. The molding step is controlled so as to form the peripheral shoulder that defines the outer extent of the upper portion of the body, and to cause the peripheral lip to mate with the annular edge. The end result of the method is to provide a composite container with double side walls and bottom for strength and stability, and a relatively thin shoulder. The peripheral lip on the shoulder insures that the container is not only strong, but attractive to the consumer for cosmetic products. The container of the invention has the same look and feel as more expensive containers previously used.

As additional features of the method, the molding step is controlled to efficiently form the peripheral lip on the shoulder of the body and mate it with the upper edge of the base; the lip substantially covering the edge and forming a smooth, rounded interface. If desired, a label is inserted and held against the inside surface of a side wall prior to blow molding so that it is embedded in the container during the process.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1 is a side view, partially in cross section to show a completed composite container, including the base and molded body according to the present invention;

FIG. 2a is an illustration in a cross sectional view of a mold for receiving the base, and through its open top receiving the parison for forming the body of the container, along with a schematic showing of the control circuit;

FIG. 2b is an illustration similar to FIG. 2a with the body blow molded into the base and forming the completed container prior to opening the mold for release;

FIG. 2c is an enlarged, partial cross sectional view of the double side wall construction of the container of FIGS. 2a and 2b and illustrating an embedded label in accordance with another aspect of the present invention;

FIG. 3 is a cross sectional view of an alternative embodiment of the finished container showing a reduced side wall and tapered adjacent side walls;

FIG. 4 is a partial cross section showing another embodiment of the present invention; namely, a bevel portion formed as a part of the annular edge of the base and covered by the peripheral lip of the upper shoulder of the body; and FIG. 5 is a cross sectional view of still another embodiment of the present invention wherein an aperture in one side wall provides for a window to view the contents of the container.

Reference will now be made in detail to the present preferred embodiment of the invention, an example of which is illustrated in the accompanying drawings.

DETAILED DESCRIPTION OF THE PREFERRED EMBODIMENT

With reference now to FIG. 1 of the drawings, a composite container 10 of the present invention is shown in its completed form. The container 10 includes a base, generally represented by the reference numeral 11 and having a bottom 12, side walls 13 and an open top forming an annular edge 14. A blow molded plastic container body 15 is formed in the base through the open top, as will be apparent from viewing this figure. In the preferred embodiment, both the base 11 and the body 15 are shown as plastic, such as PET or other suitable rigid or semi-rigid plastics that are well known in the art. The container as shown is a small bottle that is particularly suitable for cosmetics or related liquid or semi-liquid products. In addition, if desired the base 11 can be glass (not shown), or other suitable material.

As best shown in FIG. 2a, the container 10 is formed in a mold, generally represented by the reference numeral 20. The base 11 is illustrated positioned within the movable elements (not numbered) of the mold 20. An injection molded parison 21 is extending through the open top of the base 11 ready for the blow molding operation.

A representative control circuit 25 is illustrated in conjunction with the mold 20 for carrying out the method steps of the invention. The control circuit 25 includes a pressurized air source 26 to provide the blow molding function, as represented by the full line connection and action arrow going to the opening of the parison 21. In addition, the air source 26 can be valved to cycle the pressurized air in and out for cooling to complete the molding process, as illustrated by the dashed line and two-way arrow. A controller 27 operates the air source 26, as well as mold operators 28 to cycle the sections of the mold 20 in and out. A computer 29 that is programmed by operator/machine interface 30 makes the blow molding operation fully automatic. In FIG. 2b is illustrated the manner in which air is operative to mold the parison 21 into the container body 15 (see flow arrows), and subsequently to cool the entire composite container 10 prior to opening the mold 20 for release.

A peripheral shoulder 16 defines the upper portion of the container body 15, and as best illustrated in FIG. 1 the outer peripheral lip 17 mates with the annular edge 14. As thus configured, the container 10 includes a relatively thick double side walls 13, 15 and a bottom 12, 15 for strength and stability. The shoulder 16 is a single thickness and thus is in comparison relatively thin.

Overall, these structural attributes of the composite container 10 provide the look and feel of an upscale product that has come to be associated with cosmetics and health/body care products. The container 10 also has the requisite strength to avoid the flimsy feel characteristics of prior containers. The container also exhibits outstanding stability, which is a characteristic demanded by users of cosmetic products and the like. The bottom of the base 11 also includes a central opening for receiving and forming a plug 30 to anchor the bottom 12 for additional strength and to maintain the centering of the parison 21 during the initial stages of forming of the body 15 (see FIGS. 1, 2a and 2b). As illustrated, the plug 30 is reverse tapered to lock it in place against upward movement during the blow molding operation.

In addition, the base 11 incorporates an additional feature that enhances its stability. Namely, an annular corner 31 is provided that is sufficiently thick to form a substantially solid rim, as best shown in FIG. 1. As will be realized, the corner 31 is directly below or in alignment with the annular edge 14 that forms the top edge of the base 11.

In accordance with an important feature of the preferred embodiment of the present invention, the peripheral lip 17 of the shoulder 16 mates and substantially covers the annular edge 14 (see FIG. 1). In accordance with the invention, the lip 17 forms a smooth, rounded interface in order to enhance the strength of the overall container, as well as to provide an attractive appearance.

As illustrated in FIG. 2c, a label 35, attached by a transparent adhesive strip or spot 36 can be attached to the inside surface of the side wall 13 of the base 11 prior to the blow molding step of FIG. 2b. In this manner, the label 35 is visible through the transparent plastic wall 13, thus providing an additional functional feature that is also commensurate with an upscale product.

In a first alternative embodiment, the base 11' includes one side wall 13' that is reduced in height. Two of the adjacent side walls are upwardly tapered, as illustrated by the dashed line in FIG. 3. In this manner, the shoulder 16' extends down to the annular edge 14' of the wall 13'. According to the invention, its peripheral lip 17' covers the full angled extent of said edge 14'; including along the tapered walls, and thus forms the attractive, smooth rounded interface, in the same manner as in the FIG. 1 embodiment. This arrangement provides a variation of the container that is valuable from both a functional, as well as an appearance standpoint.

The FIG. 4 embodiment is different in that the side walls 13" are internally reduced adjacent the open top to form a bevel portion 14" of the annular edge. The peripheral lip 17" mates with this bevel portion 14" to provide an additional manner of connection between the base 11" and the body 15"/shoulder 16". While the lip 17" does not completely cover the annular edge, the connection does provide for full strength and provides still another attractive variation in appearance that is desirable.

In FIG. 5, the container 10 has the same basic structure as the FIG. 1 embodiment insofar as the base 11 and the body 15 with the shoulder 16 is concerned. Along one side wall 13 is provided an aperture through which a protrusion 40 is provided to form a window to the inside of the container 10. This feature provides still another variation to compliment the primary features of the container 10 of the present invention.

With respect to the method of the present invention as described above, the steps include placing the base 11 in the mold 20, inserting an injection molded plastic parison 21 into the base through the open top and blow molding the parison to provide the biaxial stretching of the parison into juxtaposition with the inside surface of the base to form the body 15. Through the control circuit 25, the peripheral shoulder 16 is formed so as to define the upper portion of the body 15, and the peripheral lip 17 is caused to mate with the upper annular edge 14 of the base 11. Also as described, prior to the blow molding step, a label 35 can be attached to the inside of the side wall 13 so that it is embedded between the wall and the juxtaposed body 15 during the blow molding step.

In summary, it will be realized that a container 10 is provided that has the attributes for improved strength and stability that is desirable in containers, such as a bottle or jar used for cosmetics or the like. The base 11 in combination with the body 15 forms relatively thick double side walls 13, as well as the relatively thick bottom. The annular rib 31 also enhances the functional strength and stability. The peripheral lip 17 mating with the upper annular edge 14 is a feature designed for strength, as well as an appearance. All together, these functional features provide the look and feel of upscale and more expensive containers. Variations include the embodiment with the reduced wall 13' and adjacent angled side walls with the extended shoulder 16' of FIG. 3, and the embodiment with the bevel portion 14" of the FIG. 4. Other features include the embedded label 35 and the protrusion 40 providing for a window for viewing the contents in the container 10.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A composite container formed at least in part by blow molding from a plastic parison with biaxial stretching, comprising:
    a molded base having a bottom, side walls and an open top forming an annular edge;
    a plastic container body formed from said parison extending into said base through the open top, said plastic container body being formed juxtaposed to said bottom and sidewalls of said molded base, wherein the bottom of said base includes a central opening for receiving and forming a plug from said parison to anchor said bottom during forming of said body;
    a peripheral shoulder defining the upper portion of the plastic container body and mating with said edge,
    whereby said composite container includes thick double side walls and bottom for strength and stability, and a relatively thin shoulder.

2. The composite container of claim 1, wherein said base is defined by a corner on said bottom and being sufficiently thick to form a substantially solid rim generally in alignment with said edge.

3. The composite container of claim 1, wherein said opening is reverse tapered to lock said plug in place against upward movement.

4. The composite container of claim 1, wherein said shoulder forms a peripheral lip to mate and substantially cover said edge and forms a smooth, rounded interface.

5. The composite container of claim 1, wherein said side walls are internally reduced adjacent said open top to form a bevel portion of said edge extending down inside said side walls, said shoulder forming a peripheral lip mating with said bevel portion.

6. The composite container of claim 1, wherein said base includes one side wall of reduced height and upwardly tapered adjacent side walls, and wherein said shoulder forms a peripheral lip to mate and substantially cover the angled, edge including along said tapered walls and forms a smooth, rounded interface.

7. The composite container of claim 1, wherein is further provided an insert label embedded between at least one side wall and the juxtaposed plastic body.

8. The composite container of claim 1, wherein is further provided an aperture in at least one side wall of the base and a window formed by a protrusion of said plastic container body extending into said aperture.

9. The composite container of claim 1, wherein said base is plastic and formed by injection molding.

10. The composite container of claim 1, wherein said base is molded glass.

11. The composite container of claim 1, wherein the edge formed by the open top of said base is annular.

12. A composite container formed at least in part by blow molding from a plastic parison with biaxial stretching, comprising:
    a base having a bottom including a central opening, side walls and an open top forming an edge;
    a blow molded plastic container body formed from said parison extending into said base through the open top to form double side walls and a double bottom, said parison forming a plug in said opening in said base to anchor said bottom during the forming of said body; and
    a peripheral shoulder defining the upper portion of the container body and mating with said edge,
    whereby said double side walls and base are thick relative to said shoulder.

13. The composite container of claim 12, wherein said opening is reversed tapered to lock said plastic container body in place against upward movement.

14. A composite container formed at least in part by blow molding from a plastic parison with biaxial stretching, comprising:
    a base having a bottom, side walls having a beveled portion, and an open top forming an edge;
    a blow molded plastic container body formed from said parison extending into said base through the open top to form double side walls and a double bottom; and
    a peripheral shoulder defining the upper portion of the container body and mating with said beveled portion of said sidewalls,
    whereby said double side walls and base are thick relative to said shoulder.

15. A composite container formed at least in part by blow molding from a plastic parison with biaxial stretching, comprising:
    a base having a bottom, side walls and an open top forming an edge, wherein at least one of said sidewalls is of reduced height relative to a second of said sidewalls;
    a blow molded plastic container body formed from said parison extending into said base through the open top to form double side walls and a double bottom; and
    a shoulder defining the upper portion of the container body, said shoulder including a peripheral lip to mate and substantially cover the edge including along said reduced height sidewall;
    whereby said double side walls and base are thick relative to said shoulder.

* * * * *